United States Patent [19]

Sakundiak

[11] Patent Number: 4,529,039
[45] Date of Patent: Jul. 16, 1985

[54] CONTROL SYSTEM FOR CONTROLLING THE DISPLACEMENT OF A WORKING PORTION OF AN IMPLEMENT

[75] Inventor: James M. Sakundiak, Sedley, Canada

[73] Assignees: Canadian Patents and Development Limited; Société0 Canadienne des Brevets et d'Exploitation Limiteé, both of Ottawa, Canada

[21] Appl. No.: 422,135

[22] Filed: Sep. 23, 1982

[30] Foreign Application Priority Data

Oct. 22, 1981 [CA] Canada .................................. 388542

[51] Int. Cl.³ ........................................... A01B 63/114
[52] U.S. Cl. ........................................... 172/4; 172/7; 318/624
[58] Field of Search ..................... 172/2, 3, 4, 7, 9, 10, 172/430; 364/424, 433; 318/587, 620, 624

[56] References Cited

U.S. PATENT DOCUMENTS

| 4,031,963 | 6/1977 | Poggemiller et al. | 172/4 |
| 4,064,945 | 12/1977 | Haney | 172/7 X |
| 4,120,364 | 10/1978 | Wooldridge | 172/2 |
| 4,221,266 | 9/1980 | Fardal | 172/4 |
| 4,355,688 | 10/1982 | Hamm et al. | 172/4 |
| 4,454,919 | 6/1984 | Arnold et al. | 172/7 X |

FOREIGN PATENT DOCUMENTS

| 985771 | 3/1976 | Canada . | |
| 1043003 | 11/1978 | Canada | 172/430 |
| 2312186 | 12/1976 | France | 172/4 |
| 1503592 | 3/1978 | United Kingdom | 172/7 |
| 127087 | 7/1959 | U.S.S.R. | 172/4 |

Primary Examiner—Richard T. Stouffer
Attorney, Agent, or Firm—John A. Baker

[57] ABSTRACT

The present invention relates to a control system. The control system controls the displacement of a working portion of an implement with respect to a reference position. The reference position can be the ground surface in the proximity of the working portion of the implement. A sensor is provided for determining the location of the ground surface to provide a reference signal. A signal generator is provided for producing a displacement signal which is representative of a preselected displacement. A comparator produces an error signal which is proportional to the sum of the reference signal and the displacement signal minus a null point signal. A servo mechanism is provided which is operable via the error signal to control the displacement of the working portion so as to substantially move the working portion the preselected displacement from the reference position thereby causing the error signal to be reduced to approximately the null point signal.

10 Claims, 3 Drawing Figures

CONTROL SYSTEM FOR CONTROLLING THE DISPLACEMENT OF A WORKING PORTION OF AN IMPLEMENT

This invention relates to an automatic electronic depth and height control system for mounted, towed or trailed implements of a sectional, multi-sectional or ganged nature. Agricultural, construction and road clearance implements fall into this category. Such implements have hydraulic means for vertically positioning sections or parts of the implement at a selected operational height above or below the ground surface. The depth and height control system controls the hydraulic system of the implement for the purpose of automatically maintaining the desired operational height or depth of the section or parts of the implement, in accordance with the selected operational height or depth and with variations in the ground surface that the implement traverses.

Prior automatic depth and height control systems have been mechanical and/or hydraulic in nature and have exhibited a lack of adaptability for use on different implements or with the various hydraulic systems used on the towing or carrying vehicle. A deficiency in system sensitivity to ground surface variations is also exhibited by these prior art control systems. Additionally, there has been a limited amount of operator control over system response. These deficiencies in prior art control systems are due to inherent limitations in the mechanical or hydraulic components and sub-assemblies.

SUMMARY OF THE INVENTION

In the present invention, elevation position data is derived from sensors or transducers mounted on the implement part or implement section to be controlled. The elevation position data determines the average elevation position of the part or section of the implement whose height or depth position is to be controlled relative to the ground surface.

The average position signal is compared to a signal that is representative of the desired operational height or depth position of the section or part of the implement to be controlled. Any difference between the average position signal and the desired position signal is detected and processed and used to control, in a proportional manner, an electrically controllable hydraulic valve that is located within the fluid path of the hydraulic system of the implement section or part to be controlled. This allows the control system to adjust the elevation position of the section or part of the implement in a continuous automatic manner, in accordance with the desired operational depth or height position and variations in the ground surface.

It is accordingly an object of the present invention to provide an automatic electronic depth and height control system having good response and sensitivity characteristics, while maintaining stability and accuracy.

It is another object of the present invention to accept elevation position data from one, two or more elevation position transducers or sensors, and to determine an average implement section or part height or depth therefrom.

It is a further object of the present invention to provide simple, flexible and extensive operator control over the action and response of the control system.

It is a further object of the present invention to provide complementary hysteresis to the inherent mechanical and/or hydraulic hysteresis in the implement used, and to the hydraulic system of the towing or carrying vehicle that is utilized.

It is another object of the present invention to provide damping means for controlling the stability of the system.

It is a further object of the present invention to provide a control system which may be used with most conventional hydraulic systems of either the opened or the closed center configuration, and with the various different fluid flow rates in the hydraulic systems used by carrying or towing vehicles.

It is also an object of the present invention to provide means for proportional control of the hydraulic valve used to effect control over the elevation positioning of sections or parts of the implements used.

The system automatically compensates for "drafting" which occurs when the implement encounters varying degrees of loading due to, for example, changing soil conditions. An implement, when encountering drafting will attempt to dig deeper into the soil. The control system of the present invention maintains a predetermined implement depth regardless of changes in loading conditions.

In accordance with an aspect of the invention there is provided a control system for controlling the displacement of the working portion of an implement from a reference position comprising: sensor means for determining the location of said reference position to provide a reference signal; signal generating means for producing a displacement signal representative of a preselected displacement; comparing means for producing an error signal proportional to the sum of said reference signal and said displacement signal minus a null point signal; and servo means which control the displacement of said working portion to said preselected displacement thereby causing said error signal to be reduced to approximately said null point signal.

BRIEF DESCRIPTION OF THE DRAWINGS

The present invention will be described in detail hereinbelow with the aid of the accompanying drawings, in which.

DETAILED DESCRIPTION OF THE DRAWINGS

Figure 1:
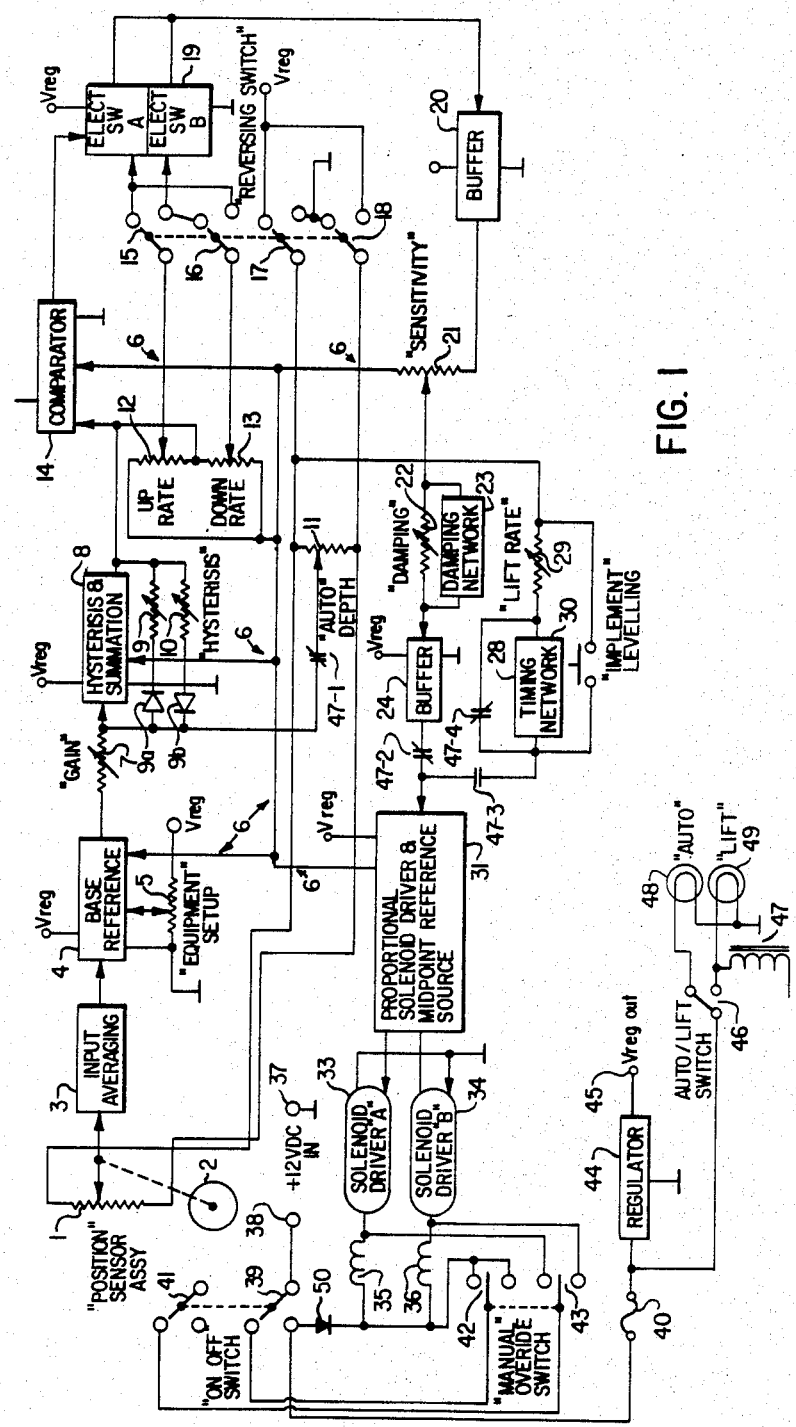
FIG. 1 is a block diagram of a particular embodiment of the present invention.

Referring now to FIG. 1 there is illustrated a block diagram of an electronic depth and height control system according to the present invention. The system accepts analog input signals and accurately positions an hydraulically controlled element in response thereto. A supply voltage is provided between terminals 37 and 38 and is fed via switch 39 and diode 50 to a common end of hydraulic valve solenoids 35 and 36. The supply voltage is also fed via fuse 40 to voltage regulator 44 and to mode switch 46. Regulator 44 provides the main circuitry supply voltage at terminal 45. Mode switch 46, energizes lamp 48 when in the "Auto" position and lamp 49 and relay 47 when in the "Lift" position.

An analog elevation position signal is provided by various transducer or sensor techniques. In this embodiment, a ground-contact type sensor of the resistance type is shown comprising a potentiometer 1 and wheel and linkage assembly 2. As the wheel moves along the ground its relative vertical position with respect to the implement is provided as an output signal. If more than one wheel and linkage assembly is provided, the output of each can be averaged to compensate for the unevenness of the ground over which the implement is moved.

The analog signal from potentiometer 1 is averaged by circuit 3 and is fed to circuit 4. The base reference circuit 4 allows the average signal from circuit 3 to be summed with the signal from potentiometer 5, providing a signal output that can be variably offset to allow the setting of an arbitrary ground surface point. Potentiometer 5 is labelled "Equipment Setup" on the front panel of the control. The output circuit of circuit 4 is scaled by potentiometer 7 and is fed to the hyteresis and summing circuit 8. Potentiometers 9 and 10 and diodes 9a and 9b provide bidirectional variable hyteresis when used in conjunction with the hysteresis and summing circuit 8.

A potentiometer 11 is placed across the regulated supply voltage. The wiper of the potentiometer is connected to the input of hysteresis circuit 8 and the signal appearing thereon is added to the averaged input signal and the reference signal. The voltage supplied by the potentiometer 11 controls the depth or height to which the implement is set below or above the ground surface reference. That signal is supplied to the hysteresis and summing circuit 8 via the normally closed contact 47-1 which remains closed when solenoid 47 is deactivated and the mode switch 46 is placed in the "Auto" position.

The output signal from circuit 8 is fed to potentiometers 12 and 13 which can be adjusted to control the rate of the UP and DOWN movement of the implement, respectively. The output signal from circuit 8 is also fed to one input of comparator 14.

The output signals from the potentiometers 12 and 13, which control the UP and DOWN rate, are fed to portions 15 and 16 of a reversing switch. Portions 17 and 18 of that reversing switch are connected to the potentiometer 11 to reverse the polarity of the depth signal. In addition, portions 17 and 18 of the reversing switch are connected to the sensor potentiometers which sense the vertical position of the ground surface. By activation of the reversing switch the potential across the position sensing potentiometers can also be reversed. It should be noted that portions 15, 16, 17 and 18 of the reversing switch are ganged together and are activated simultaneously.

Electronic switch 19 is controlled by the output of comparator 14, the operation of which will be described in detail hereinbelow. The selected UP or DOWN analog signal is fed from electronic switch 19 to buffer 20. The output of buffer 20 is fed through a damping network via a sensitivity potentiometer 21. The damping network 23 is controlled by potentiometer 22. The damping network inhibits the electronic system from hunting rapid but unimportant changes in implement depth caused by rapid changes in the vertical direction of the ground surface.

The output of the damping network 23 is fed to another buffer circuit 24. Buffer 24 feeds the signal to the solenoid driver circuit 31 via a normally closed contact 47-2. When the mode switch 46 is in the "Lift" position, the damper network and buffer are bypassed via the opening of contact 47-2 and the closing of normally open contact 47-3.

The activation of relay 47 disconnects potentiometer 11 in order to provide a large error signal to circuit 8, thereby allowing a fast return to the selected position upon the return of the mode switch 46 to the "Auto" position. The timing network 28 is usually in the discharged condition due to the normally closed contacts 47-4. However, in the "Lift" mode, the output of the timing network 28 passes through the contact 47-3 to the input of the solenoid driver circuit 31. The period of time that the lift condition is sustained is adjustable by potentiometer 29 which is identified on the control panel of the system by the title "Lift Rate". Potentiometer 29 controls the timing rate of the timing network 28. When in the "Lift" mode, switch 30 bypasses the timing network and the potentiometer 29 to apply a full lift voltage to the solenoid driver 31 via relay contacts 47-3. Switch 30 is therefore labelled "Implement Levelling" on the front panel of the control system. This switch causes the full extension or retraction of the hydraulics.

Proportional solenoid driver and mid-point reference source 31 performs two functions. It provides a null point, reference 6 in FIG. 1, for the entire circuit. This mid-point reference is used to bias circuits 4, 8 and is further used to bias the UP/DOWN rate potentiometers 12 and 13. The sensitivity potentiometer 21 is also biased by the null point reference 6. Finally, the comparator circuit 14 compares the signal output from the hysteresis and summation circuit 8 with the null point reference voltage. When the output of hysteresis and summation circuit 8 exceeds the null point reference voltage, the comparator 14 activates electronic switch 19. The null reference point 6 is exactly one-half of the regulated supply voltage appearing at terminal 45. The circuit 31 accepts a control signal from either relay contact 47-2 or 47-3 depending on the selected mode, and outputs two square wave signals modulated by varying their duty cycle. The circuit 31 provides a signal to either solenoid driver A, 33 or solenoid driver B, 34 depending on the polarity of the input signal with respect to the reference potential. The two square wave signals output by circuit 31, as mentioned above, are fed to two solenoid drive circuits 33 and 34. Solenoid drivers 33 and 34 drive solenoids 35 and 36 respectively. These solenoids are located within the hydraulic valve.

An ON/OFF switch includes switch sections 39 and 41. Switch section 39 provides the full supply voltage to switch section 42 of the "Manual Override" switch when in the OFF position. Similarly, switch segment 41 provides a ground to switch section 43 when the ON/OFF switch is in the OFF position. Manual override switch sections 42 and 43 therefore allow the manual operation of the solenoids when the ON/OFF switch is in the OFF mode.

Figure 2:
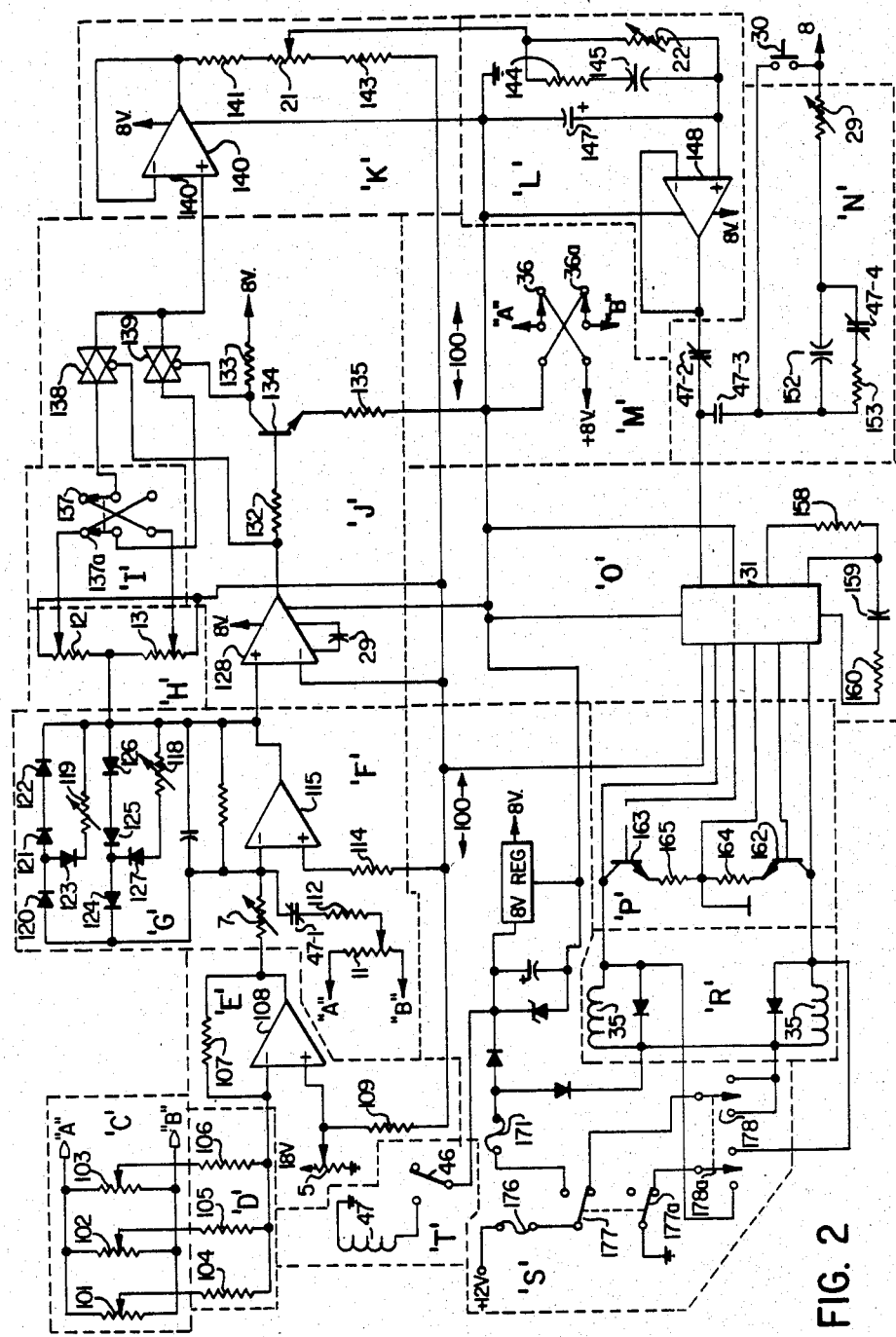
FIG. 2 is a detailed schematic diagram of the embodiment shown in FIG. 1.

FIG. 2 is a schematic diagram of a particular embodiment of the entire control system. The schematic diagram has been blocked off into areas C through T. Each area will be described in detail hereinbelow.

Figure 3:
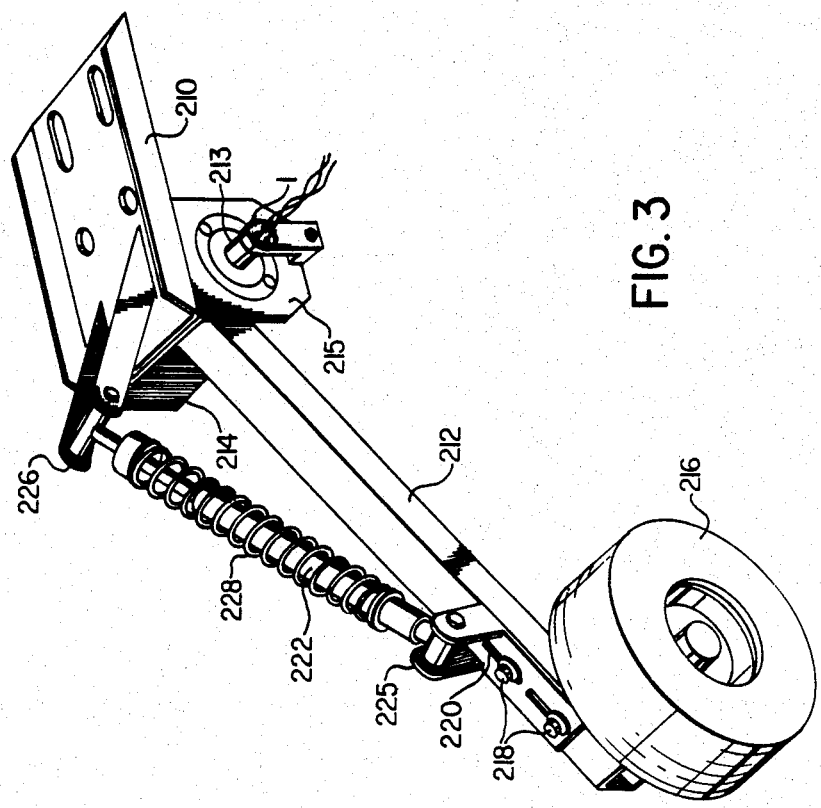
FIG. 3 is a perspective view of one type of elevation position transducer assembly that can be used with the present invention.

Block C represents the three position sensor potentiometers 101, 102, and 103. Each wiper shaft of the three potentiometers is attached to a respective linkage ending in a wheel assembly. Such an assembly will be described in detail hereinbelow with the aid of FIG. 3. The bodies of the potentiometers are rigidly attached to the implement frame or part whose elevation position it is desired to control. The trailing wheels are in contact with the ground surface and variations in surface height of the ground surface are converted to a rotary motion of the potentiometer wipers causing a varying signal voltage to be produced. The voltage at the output of each potentiometer is indicative of the elevation position of the wheel to which it is connected, depending upon the voltage supplied across terminals A and B and the polarity of the voltage. This type of elevation transducer is outlined in detail in Canadian Pat. No. 1,043,003 which issued on Nov. 21, 1978 to James M. Sakundiak.

Block D accepts the signal outputs of the three potentiometers and averages their values through the action of resistors 104, 105 and 106. The signal is then fed to Block E which is comprised of an op-amp 108, gain resistor 107, bias resistor 109 and potentiometer 5. Resistor 109 feeds some voltage from the null point line 100 to the non-inverting input of op-amp 108. The non-inverting input to op-amp 108 is also connected to "Equipment Setup" potentiometer 5. The output signal from the op-amp 108 can therefore be offset by the desired amount in order to set an arbitrary ground surface reference point.

There is hysteresis or mechanical and hydraulic lag in all mechanical linkages. In other words, it requires some positive applied force to be exerted before mechanical movement occurs. This mechanical lag can be complemented by an electrical hysteresis circuit. Such an electrical hysteresis circuit is defined by Blocks F and G of FIG. 2. The output from op-amp 108 is fed to the inverting input of an op-amp 115 in Block F via gain potentiometer 7. The non-inverting input of op-amp 115 is fed via resistor 114 from the null point reference line 100. When mode switch 46 in Block T is in the "Auto" positon as shown, normally closed contact 47-1 feeds an auto depth control voltage from potentiometer 11 via resistor 112. The voltage which activates potentiometer 11 is derived from terminals A and B which will be described in detail hereinbelow with respect to Block M.

The actual depth to which the implement is desired to be set is adjusted by changing the voltage entering the inverting terminal of op-amp 115 by adjusting potentiometer 11.

The hysteresis amplifier and summer shown in Blocks F and G are designed so that no change in output is obtained in an adjustable region around the set point of the implement depth. Such a region is known as the deadband. This is accomplished by providing feed back via diodes 124, 125, 126, 127 and potentiometer 118. The device must control in both directions above and below the null point and as a result a group of diodes 120 through 123 and potentiometer 119 controls the hysteresis effect around the null point in the opposite direction. Such a hysteresis effect is simply obtained by controlling the feed back in a non-linear manner in the region of the null point.

The output from Blocks F and G enter Block H and feed potentiometers 12 and 13. The output of these potentiometers is fed to electronic switches 138 and 139 via reversing switch segments 137a and 137 in Block I. The potentiometers 12 and 13 control the rate UP and DOWN, respectively.

A mid-point reference signal defined in FIG. 2 by the numeral 100 (also called a null point reference) is generated from the proportional solenoid driver and mid-point reference source 31. This signal is merely one-half the value of the voltage appearing across terminals A and B. This voltage is fed to the inverting terminal of op-amp 128 shown in Block J. The output from op-amp 115 is fed to the non-inverting input of op-amp 128. As a result, op-amp 128 operates as a comparator, producing a signal which varies about the mid-point. The output of op-amp 128 operates an electronic switch 138 if the output is of the correct polarity. Resistors 132, 133 and 135 along with transistor 134 provide an inverting device which, in turn, controls the operation of electronic switch 139. Switch 139 is activated upon the receipt of a signal of the correct polarity. Regardless of the position of the reversing switch shown in Block I, the signal is fed through either electronic switches 138 or 139 to the non-inverting input of a buffer amplifier 140 shown in Block K. A sensitivity control is provided by the dividing network comprising resistors 141 and 143 and potentiometer 21. The output of potentiometer 21 is fed to Block L. Potentiometer 121 acts as a sensitivity control.

Block L constitutes a combination damping and buffer network. The signal is damped with respect to its rate of variation via capacitors 145 and 147, resistor 144 and potentiometer 22. Potentiometer 22 varies the charging rate of capacitor 145 and therefore controls the degree of damping. The damped control signal is fed to the non-inverting input of an op-amplifier 148.

When the mode selector switch 46 is in the "Auto" position, normally closed contact 47-2 feeds the output signal from buffer amplifier 148 to the input of the proportional solenoid driver and mid-point reference source 31. If, however, the mode switch 46 is in the "Lift" position, solenoid relay 47 is activated which, in turn, disconnects the output of op-amp 148 from the proportional solenoid driver 31 and connects a timing and lift rate circuit defined in Block L via contact 47-3. In the "Lift" mode potentiometer 29 controls the charge rate of capacitor 152, which in turn activates the proportional solenoid driver to raise the implement. This circuit can be by-passed by switch 30 which immediately levels the implement.

Block O contains the proportional solenoid driver and mid-point reference source chip 31. This is a standard off-the-shelf item manufactured by the Webster Electric Co. (trade mark) and is designated part number H17214. Chip 31, in conjunction with resistors 158 and 160 and capacitor 159 provide a dual output of square wave pulses which are proportional with respect to their duty cycle. This driver circuit also contains the necessary circuitry for providing the null point reference 100 which, as mentioned above, is exactly one-half the supply voltage. The output signals from the driver circuit 31, consist of square waves whose duty cycle is varied proportionally to the magnitude and direction from the null point reference 100.

Depending on the polarity of the output signal, either power transistor 162 or 163 is activated. Power transistors 162 and 163 appearing in Block P merely provide a current which is sufficient to activate the solenoids 35 and 36 which in turn, activate the hydraulic valve. The transistors 162 and 163 are current limited by resistors 164 and 165, respectively.

The main power supply is defined in Block S. Switch elements 177 and 177a constitute an ON/OFF switch. In the ON mode a 12 volt source is fed via fuse 176 and fuse 171 to a regulated power supply. This regulated power supply provides the voltage for the electronic circuitry and in particular the reversing switch 36 and 36a set out in Block M. By activating the inverting switch the polarity appearing at terminals A and B are reversed. Such a reversal allows the device to operate as either a depth control below a ground surface reference or a height control above a ground surface reference.

When the ON/OFF switch 177 is in the OFF mode power is fed to a manual override switch consisting of contacts 178a and 178. Depending on the position of these contacts, either solenoid 35 or solenoid 36 is activated.

As was mentioned above, the device must work from a reference point. This reference point is determined by the ground surface. Due to undulations on the ground surface over which the implement travels, it is desirable to obtain more than one ground reference. Each ground reference is obtained by a device such as the device set out in FIG. 3. Such a frame and wheel structure would be clamped as close as possible to the implement section being used. A frame 210 is clamped to the frame of the implement section being used and contains webs 214, 215 which secure a pivoting arm 212. A wheel 216 is attached to the arm 212 by bolts 218 and 220. Up and down movement of the wheel is translated into a rotary movement of shaft 213. Brackets 225 and 226 hold a shock absorber 222 and spring arrangement 228 which dampen irregular movement of the wheel 216.

The body of a potentiometer 1 is clamped to the web 215. The shaft of potentiometer 1 is connected to the pivoting shaft 213 of the arm 212. A movement up and down of the wheel 216 is translated into a up and down movement of the arm 212 and a pivoting movement of the shaft 213. As a result, the voltage is varied at the center output of the potentiometer 1.

The wheel 216 may be replaced by a curved skid which would follow the ground surface in close proximity to the working portion of the implement.

As was mentioned earlier, this invention automatically controls the depth of an implement under varying loads. If, for example, the ground in which the implement travelled suddenly became heavy, the implement would tend to dig in or increase its depth within the ground. The system according to the present invention immediately detects such a depth change due to the "heavier" ground and automatically adjusts the depth of the implement to the preset value. This control is known as a drafting control and is automatically inherent in the present invention.

I claim:

1. A control system for controlling the displacement of a working portion of an implement from a reference position, said reference position being the ground surface in the immediate proximity of said working portion and the displacement being the depth or height above the ground surface, comprising:
    (a) sensor means for determining the location of said reference position to provide a reference signal, said sensor means including a plurality of sensors, each adapted to be in the proximity of said working portion and each providing a sensor signal indicative of a reference position of the respective sensor, wherein said control system includes averaging means for producing said reference signal which is an average of all of said sensor signals, said reference signal being summed with a second reference signal to produce a modified reference signal which can represent an artificial ground surface point;
    (b) signal generating means for producing a displacement signal representative of a preselected displacement;
    (c) comparing means for producing an error signal proportional to the sum of said modified reference signal and said displacement signal minus a null point signal; and
    (d) servo means for controlling the displacement of said working portion to said preselected displacement thereby causing said error signal to be reduced to approximately said null point signal, wherein said error signal is amplified in a hysteresis amplifier to produce an amplified error signal, said hysteresis amplifier having a small gain when the value of said modified reference signal plus said displacement signal is in the neighborhood of the value of the null point signal, and the hysteresis amplifier having a larger gain when the value of said modified reference signal plus said displacement signal is outside the neighborhood of the value of said null point signal, to thereby produce a deadband symmetrical about said null point signal.

2. The control system according to claim 1, wherein said hysteresis amplifier includes bidirectional, adjustable feedback to thereby provide an adjustable deadband.

3. The control system of claim 2, wherein the polarity of the error signal with respect to the null point signal determines the direction of displacement of the working portion from the reference position.

4. The control system of claim 3, wherein said control system further includes a damping stage which is adjustable to eliminate rapid variations in said error signal which would cause rapid movement of said servo means.

5. The control system of claim 4, further including a control signal generator means which is responsive to the magnitude and polarity of said error signal for producing a first and a second control signal, said first and second control signals being square waves, each having a duty cycle which is dependent on the magnitude of said error signal, said first control signal being substantially zero when the polarity of said error signal with respect to said null point signal is in one sense and said second control signal being substantially zero when the polarity of said error signal with respect to said null point signal is in the opposite sense.

6. The control system of claim 5 wherein said servo means is an electrically controlled hydraulic valve and wherein said valve is controlled by a first and a second solenoid, said first solenoid being activated by said first control signal and said second solenoid being activated by said second control signal.

7. The control system of claim 6, wherein power amplifier means are located between said first and second solenoids and said control signal generator means.

8. The control system according to claim 1, wherein said sensor means comprises:
    (e) frame means for connecting said sensor means to said implement;
    (f) web means, connected to said frame means for pivotally supporting an axle mounted to an arm member at one end;
    (g) ground surface following means connected to said arm member at its opposite end;
    (h) potentiometer means having a body portion and a rotating shaft portion, said body portion being secured to said web means and said shaft portion being connected to said axle; and (i) mechanical damping means connected between said frame means and said arm member.

9. The control system according to claim 8 wherein said ground surface following means is a wheel.

10. The control system according to claim 9, wherein said damping means is comprised of a shock absorber having a spring coaxially mounted thereon.

* * * * *

UNITED STATES PATENT AND TRADEMARK OFFICE
CERTIFICATE OF CORRECTION

PATENT NO. : 4,529,039
DATED      : July 16, 1985
INVENTOR(S): James M. SAKUNDIAK It is certified that error appears in the above-identified patent and that said Letters Patent is hereby corrected as shown below:

On the title page of the patent, where the second assignee's name appears, "SOCIÉTÉO" should read --SOCIÉTÉ--.

Signed and Sealed this

Twenty-ninth Day of October 1985

[SEAL]

Attest:

DONALD J. QUIGG

Attesting Officer

Commissioner of Patents and Trademarks—Designate